United States Patent
Rosqvist

(10) Patent No.: US 10,963,714 B2
(45) Date of Patent: Mar. 30, 2021

(54) METHOD FOR UPDATING BIOMETRIC REFERENCE DATA

(71) Applicant: PRECISE BIOMETRICS AB, Lund (SE)

(72) Inventor: Fredrik Rosqvist, Malmö (SE)

(73) Assignee: Precise Biometrics AB, Lund (SE)

( * ) Notice: Subject to any disclaimer, the term of this patent is extended or adjusted under 35 U.S.C. 154(b) by 310 days.

(21) Appl. No.: 16/067,993

(22) PCT Filed: Dec. 19, 2016

(86) PCT No.: PCT/EP2016/081717
§ 371 (c)(1),
(2) Date: Jul. 3, 2018

(87) PCT Pub. No.: WO2017/121580
PCT Pub. Date: Jul. 20, 2017

(65) Prior Publication Data
US 2019/0005342 A1    Jan. 3, 2019

(30) Foreign Application Priority Data
Jan. 13, 2016  (SE) .................... 1650034-0

(51) Int. Cl.
*G06F 16/00*  (2019.01)
*G06K 9/00*  (2006.01)
(Continued)

(52) U.S. Cl.
CPC ......... *G06K 9/00926* (2013.01); *G06F 16/22* (2019.01); *G06F 16/2379* (2019.01); *G06F 16/2457* (2019.01); *G06K 9/00087* (2013.01)

(58) Field of Classification Search
None
See application file for complete search history.

(56) References Cited

U.S. PATENT DOCUMENTS 7,333,637 B2 *  2/2008  Walfridsson ....... G06K 9/00087
                                                       235/382
8,327,134 B2 * 12/2012  Griffin ................. G06F 21/32
                                                       713/158

(Continued)

OTHER PUBLICATIONS

U Uludag et al. "Biometric template selection and update: a case study in fingerprints", Pattern Recognition, Jul. 2004, pp. 1533-1543 (Year: 2004).*

(Continued)

*Primary Examiner* — Debbie M Le
(74) *Attorney, Agent, or Firm* — Capitol City TechLaw

(57) ABSTRACT

A method for updating biometric reference data for a person is provided. The biometric reference data is defined as a multi-template formed by a number of templates each representing an area of an associated biometric object of the person. The method comprises providing at least one template associated with a biometric image that depicts at least one area of a finger of the person. Moreover, the method comprises matching the at least one template to the multi-template of the biometric reference data and in the event of a match, updating the multi-template of the biometric reference data with at least one selected previously matched template stored in a candidate template queue. Furthermore, the method comprises storing the matched template in the candidate template queue.

9 Claims, 3 Drawing Sheets

(51) Int. Cl.
    *G06F 16/22*       (2019.01)
    *G06F 16/23*       (2019.01)
    *G06F 16/2457*   (2019.01)

(56) References Cited

U.S. PATENT DOCUMENTS

| | | | |
|---|---|---|---|
| 9,268,991 B2* | 2/2016 | Russo | G06K 9/00087 |
| 9,508,122 B2* | 11/2016 | Setterberg | G06T 3/4038 |
| 9,558,415 B2* | 1/2017 | Paul | G06K 9/00892 |
| 9,600,730 B2* | 3/2017 | Paul | G06K 9/00885 |
| 9,674,184 B2* | 6/2017 | Kim | G06F 21/32 |
| 9,996,723 B2* | 6/2018 | Midgren | G06F 21/32 |
| 10,277,400 B1* | 4/2019 | Griffin | H04L 9/30 |
| 2004/0003295 A1* | 1/2004 | Elderfield | G07C 9/257 |
| | | | 713/176 |
| 2007/0110283 A1* | 5/2007 | Hillhouse | G06K 9/6255 |
| | | | 382/115 |

OTHER PUBLICATIONS

Stan Z. Li, "Encyclopedia of Biometrics", Jan. 1, 2009, Springer, XP055354849, pp. 524-528.

Davide Maltoni et al., "Handbook of Fingerprint Recognition, 2nd ed.", Jan. 1, 2009, Springer, XP055354853, pp. 323-324.

\* cited by examiner

METHOD FOR UPDATING BIOMETRIC REFERENCE DATA

This application claims priority under 35 USC 119(a)-(d) to SE patent application No. 1650034-0, which was filed on Jan. 13, 2016, the entire content of which is incorporated herein by reference.

TECHNICAL FIELD

The present invention generally relates to a method of updating reference biometric data to be used for subsequent biometrics matching.

BACKGROUND

Use of small biometric sensors, i.e. sensors that do not collect biometric data about the whole biometric object, may be desired due to constraints caused by e.g. physical design of an apparatus used to collect the biometric data. Due to the small size of the biometric sensor in view of the whole biometric object, e.g. a fingerprint, normally several biometric templates are required to be stored or reconstructed as reference or multi-template data for subsequent matching. Since the biometric object may change over time, e.g. due to ageing, environmental impacts etc., it may be advantageous to update the reference data. Some known solutions allow for a so called automatic updating of the multi-template or reference data with data relating to each matched biometric template. Such an automatic update is associated with the risk that an imposter's template in the event of an erroneous successful match, would end up in the reference multi-template.

Hence, it would be advantageous to provide an improved method of updating a biometric multi-template or reference data.

SUMMARY

According to an aspect a method for updating biometric reference data for a person is provided, wherein the biometric reference data is defined as a multi-template formed by a number of templates each representing an area of an associated biometric object of the person. The method comprises providing at least one template associated with a biometric image that depicts at least one area of a finger of the person. Moreover, the method comprises matching the at least one template to the multi-template of the biometric reference data. Furthermore, and in the event of a match, the method comprises updating the multi-template of the biometric reference data with at least one selected previously matched template stored in a candidate template queue. Moreover, the method comprises storing the matched template in the candidate template queue.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DESCRIPTION

Biometrics is used for recognising and/or authenticating individuals from physiological characteristics. A certain biometric object, such as fingerprint, face, iris, vein pattern, hand, foot, retina, etc. is normally chosen for a biometric comparison, i.e. biometric matching, although combined systems may be applied, i.e. where two or more biometric objects are used for the matching. It is here to be noted that matching is performed by processing means such as signal processing, digital processing, etc., wherein biometric data from the biometric object is considered. Thus, within the processing means, only data representing the biometric object is present, wherein the way of representing the biometric object is important. Furthermore, the term "template" is used within the field of biometric matching, which refers to an enrolled representation of a biometric object which may be stored for a later comparison with a biometric "sample" to determine if the sample emanates from the same biometric object as the template, i.e. matching. Within biometrics, it is often referred to the term "features". Features are also often divided into level one features, such as quality or orientation field features of the biometric object, level two features, such as minutiae or other features describing sub-objects of the biometric object, and level three features, such as pores or other highly detailed elements of the biometric object. One or more levels of features may be used for biometric matching.

In general, biometric reference data to which each template is compared during matching is defined as a multi-template formed by a number of templates of one or more authorized users. However, the multi-template of the biometric reference data is not static. For example, fingerprints of an authorized user may change over time, thereby increasing the risk of a mismatch unless the multi-template is also updated from time to time.

Some known solutions of updating the multi-template allows any matched template to update the multi-template. These are associated with the risk that an imposter's template in the event of an erroneous successful match, would end up in the reference multi-template. Hence, once an imposter's template has been successfully matched, and the reference multi-template has been updated with the associated imposter template, this means that the chances of a future successful match increases. Hence, there is a need for improving the way the reference multi-template is updated such as to limit risk of an imposter to successfully update the reference multi-template with his/her imposter template.

The biometrics data referred to herein may relate to fingerprint data.

Figure 1:
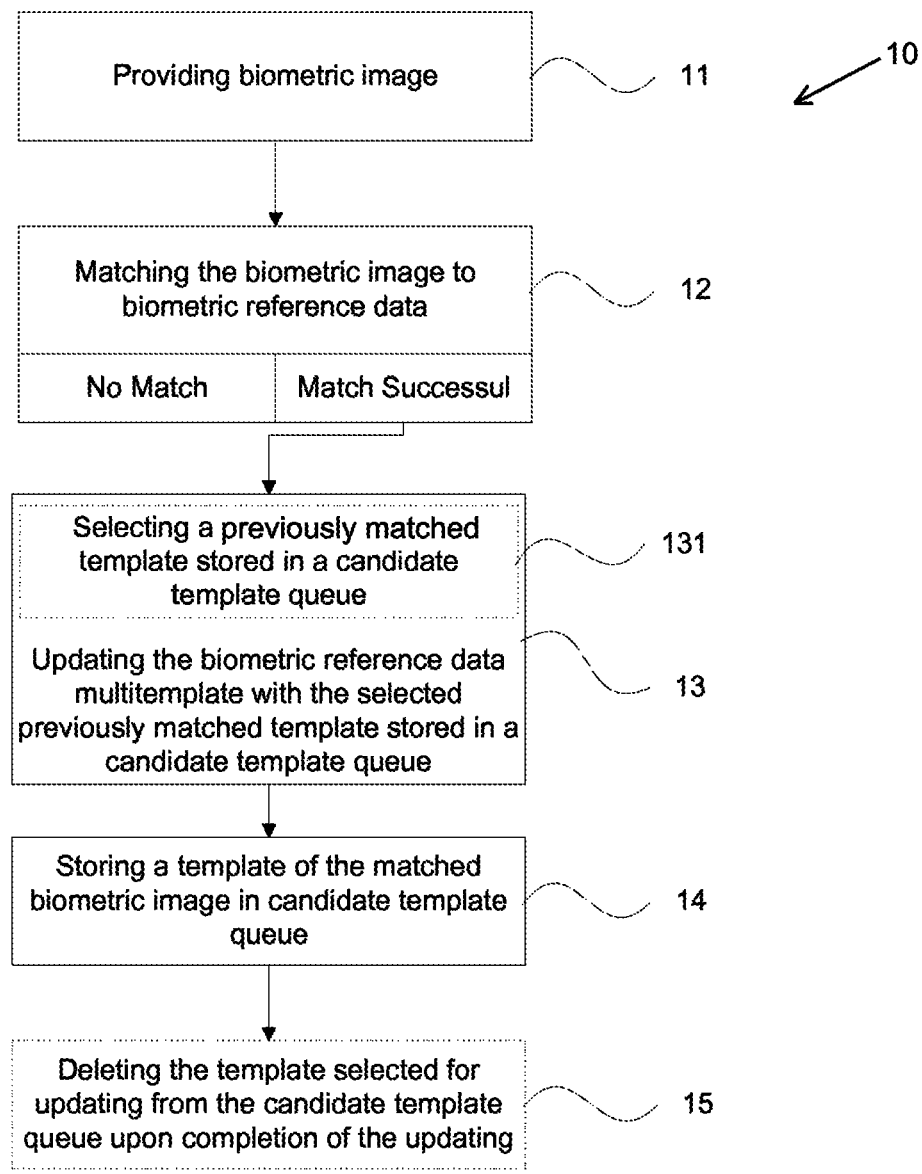
FIG. 1 is a flow chart schematically illustrating a method of updating a reference biometric data.

FIG. 1 shows a flowchart of a method 10 for updating a biometric reference data for a person. As above, the biometric reference data is defined as a multi-template comprising a number of templates each representing an area of an associated biometric object of the person. The method 10 comprises providing 11 at least one template associated with a biometric image that depicts at least one area of a finger of the person. The method further comprises matching 12 the at least one template to the multi-template of the biometric reference data and in the event of a match, the method further comprises updating 13 the multi-template of the biometric reference data with at least one selected previously matched template stored in a candidate template queue. The method further comprises storing 14 the matched template in the candidate template queue.

By the provision of a candidate template queue any successfully matched template will not be immediately updated into the multi-template of the reference data, and at least it will take longer time before an imposter's successfully matched template will end up in the multi-template.

Moreover, by using a candidate template queue it is also possible to carefully choose which stored templates in the queue that should be selected for updating of the multi-template.

Selecting the Stored Template for Updating of the Multi-Template

As shown in FIG. 1 the method may optionally comprise selecting (131) the at least one previously matched template stored in the candidate template queue based on at least one property of said previously matched template including its associated order in the candidate template queue.

Referring to the associated order, the previously matched template selected for updating may relate to the oldest template stored in the candidate template queue.

The at least one property taken into account before selecting a certain template previously stored in the template candidate queue may relate to the certain template's similarity to other templates stored in the candidate template queue. Hence, for the event that an imposter's matched template has been stored in the candidate template queue, unless provisions are made, it is open for selection to update the reference multi-template. However, in order to reduce this risk, a similarity check may be conducted, where a template open for selection is compared, e.g. in terms of general alignment of the template, to the at least one other or all templates stored in the candidate template queue, and if the template open for selection does not significantly differ from the at least one other stored candidate template, said template may be selected for updating the reference multi-template.

Figure 5:
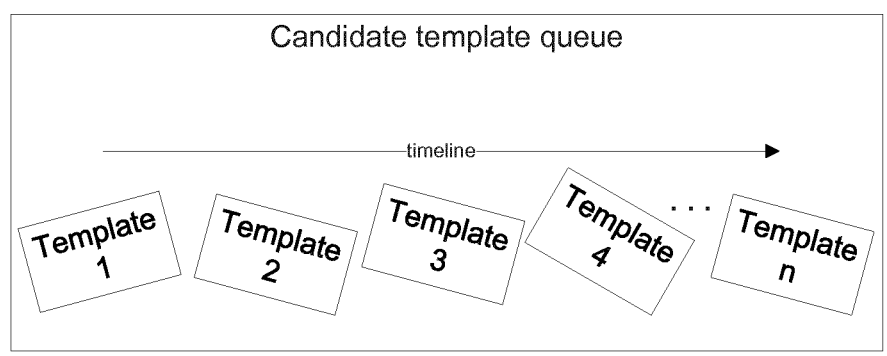
FIG. 5 schematically shows the general alignment of a number of templates stored in a candidate template queue.

FIG. 5 shows schematically the general alignment of a number of templates stored in the candidate template queue. As seen templates nos. 2 to N have a general alignment which is tilted clockwise, whereas Template No. 1 is tilted counter clockwise. In this situation, by conducting a similarity check in terms of general alignment Template No. 1 may be dismissed from selection for updating the reference multi-template, although it may refer to the oldest stored template in the candidate template queue.

For example, when the biometric data refers to a fingerprint, a check for general alignment is advantageous since the general alignment of the authorized user templates is mostly very similar, since the user tend to position his/her finger in roughly the same way over the fingerprint sensor for accessing the reference data. On the other hand, an imposter's template may well be out of alignment compared to the authorized user templates, and by performing the similarity check it is possible to dismiss "misaligned" templates suspected to be an imposter's template from being selected for updating the reference multi-template.

In an embodiment, the similarity check is performed in associate with the selecting 131 when a predetermined number of templates are stored in the candidate template queue.

Unless an imposter steals a device being provided with biometric matching capabilities and thereby removes it from the scene, most times an imposter only have limited time intervals to try to access the authorized data being protected by the biometric authentication system. For example, by selecting the oldest stored template of the candidate template queue the risk that the imposter's template will be updated into the multi-template decreases. Since the imposter's template is not updated in the reference multi-template the chances for the imposter to successfully accessing the authorized data at a second instance is not increased. Hence, the candidate template queue significantly improves the safety compared to solutions where the matched templates are automatically updated into the reference multi-template.

Updating the Multi-Template with Candidate Templates

Figure 2:
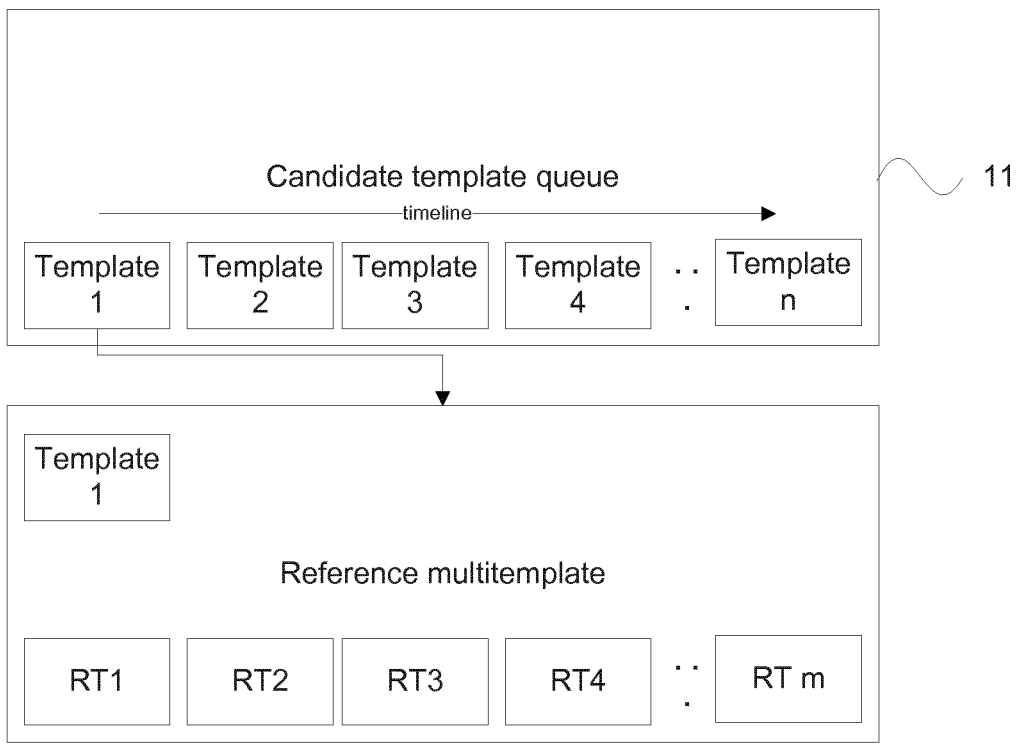
FIG. 2 schematically shows how a template from a candidate template queue is selected for updating the reference multi-template.

In an embodiment, the updating 13 is executed when a predetermined number of matched templates, e.g. 3 to 50, have been stored in the candidate template queue. Since no updating will occur before this predetermined number of successfully matched templates have been stored in the candidate template queue, this will mean that the time before a potential imposters template could be updated into the multi-template will increase with an increasing predetermined number. With reference to FIG. 2, when a predetermined number n of successfully matched templates have been stored in the candidate template queue, in this case template 1, the first stored in the candidate template queue is selected for updating the reference multi-template.

Deleting Templates Stored in the Candidate Template Queue

Figure 3:
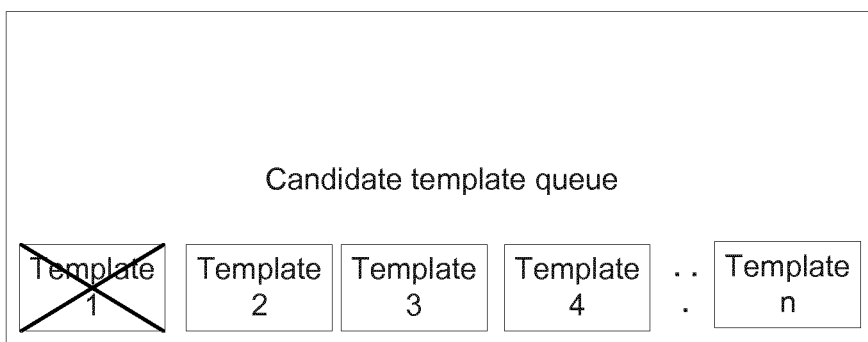
FIG. 3 schematically shows that a template from a candidate template queue is deleted therefrom after it has been used to update the reference multi-template.
Figure 4:
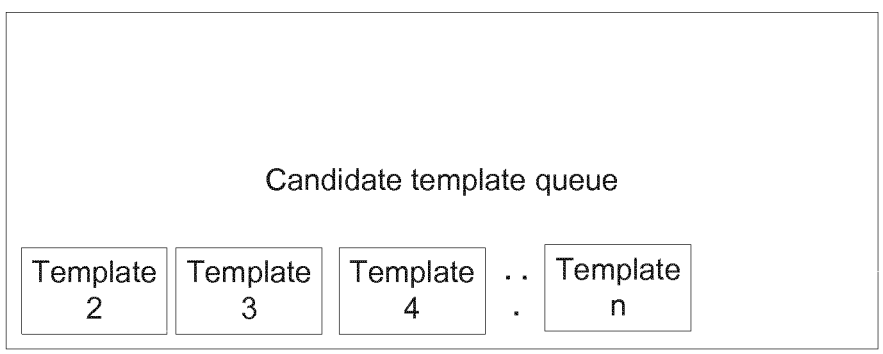
FIG. 4 schematically shows the appearance of the candidate template queue when the template of FIG. 3 has been deleted.

Once the multi-template has been updated with a selected stored template from the candidate template queue, the selected stored template may be deleted or removed from the candidate template queue. As seen with reference to FIG. 1 the method 10 comprises an optional block 15 of deleting the template selected for updating from the candidate template queue upon completion of the updating. As seen in FIG. 3, "Template 1" can be deleted when "Template 1" has updated the multi-template of FIG. 2. FIG. 4 schematically shows the candidate template queue after deletion of "Template 1."

In the event, a predetermined number of successfully matched templates are required for updated the multi-template, when "Template 1" is deleted one additional successfully matched template needs to the be stored to the candidate template queue before any further updating is possible.

Storing Successfully Matched Templates in the Candidate Template Queue

In an embodiment, the storing 14 is executed provided that the matched template has a feature being similar to, i.e. not significantly differing from, at least one other template stored in the candidate template queue. Such a feature may be related to the general alignment of the template. Hence, in the event the alignment of the matched template differs from the alignment of at least one stored candidate template, the matched template will not be stored into the candidate template queue. It is also possible to take into account the general alignment, i.e. mean alignment, of the stored candidate templates of the candidate template queue. Hence, as long as the alignment of the matched template does not significantly differ from the general alignment of the stored candidate templates, said matched template will be stored into the candidate template queue.

Alternatively or additionally, the storing 15 and/or updating 13 is/are executed at random intervals, i.e. not for every single matched template, thereby making it less likely that an imposter's template is stored in the candidate template queue.

The storing 15 and/or updating 13 could alternatively also be executed at scheduled time windows, i.e. not for every single matched template.

The invention claimed is:

1. A method for updating biometric reference data for a person, wherein the biometric reference data is defined as a multi-template representing an associated biometric object of the person, the multi-template comprising a plurality of templates each representing an area of the associated biometric object of the person, the method comprising:
   providing a candidate template associated with a biometric image that depicts an area of a biometric object of the person;
   matching the candidate template to the multi-template of the biometric reference data;
   selecting, in the event of a match, a template stored in a candidate template queue, the candidate template queue storing a plurality of templates;
   updating, in the event of a match, the multi-template of the biometric reference data with the selected template stored in the candidate template queue; and
   storing, in the event of a match, the matched candidate template in the candidate template queue.

2. The method according to claim 1, further comprising: selecting the template stored in the candidate template queue based on at least one property of the template stored in the candidate template queue including its associated order in the candidate template queue.

3. The method according to claim 1, wherein the template stored in the candidate template queue selected for updating is the oldest template stored in the candidate template queue.

4. The method according to claim 1, further comprising: deleting the selected template from the candidate template queue upon completion of the updating.

5. The method according to claim 1, wherein the storing is executed provided that the matched candidate template does not differ in terms of general alignment, compared to a reference level, from at least one other template stored in the candidate template queue.

6. The method according to claim 1, wherein the storing and updating are executed at random intervals and not for every single matched candidate template.

7. The method according to claim 1, wherein the storing and updating are executed at scheduled time windows and not for every single matched candidate template.

8. The method according claim 2, wherein a property of the template stored in the candidate template queue which the selecting is based on relates to the template's similarity in alignment to other templates stored in the candidate template queue.

9. The method according to claim 1, wherein the biometric data relates to fingerprint data.

\* \* \* \* \*